United States Patent
Xiang et al.

(10) Patent No.: US 11,120,192 B1
(45) Date of Patent: Sep. 14, 2021

(54) WHITE SPACE INSERTION FOR ENHANCED ROUTABILITY

(71) Applicant: International Business Machines Corporation, Armonk, NY (US)

(72) Inventors: Hua Xiang, San Jose, CA (US); Gustavo E. Tellez, Hyde Park, NY (US); Gi-Joon Nam, Chappaqua, NY (US); Jennifer Kazda, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/853,180

(22) Filed: Apr. 20, 2020

(51) Int. Cl.
*G06F 30/394* (2020.01)
*G06F 30/392* (2020.01)
*G06F 119/12* (2020.01)

(52) U.S. Cl.
CPC .......... *G06F 30/394* (2020.01); *G06F 30/392* (2020.01); *G06F 2119/12* (2020.01)

(58) Field of Classification Search
USPC ....................................................... 716/122
See application file for complete search history.

(56) References Cited

U.S. PATENT DOCUMENTS

| 7,200,827 B1 | 4/2007 | Ku et al. | |
| 2009/0031269 A1* | 1/2009 | Chen | G06F 30/392 |
| | | | 716/119 |
| 2016/0232272 A1* | 8/2016 | Liu | G06F 30/392 |

OTHER PUBLICATIONS

Yang, Xiaojian, et al., "Routability-Driven White Space Allocation for Fixed-Die Standard-Cell Placement," IEEE Transactions on Computer-Aided Design of Integrated Circuits and Systems 22, No. 4, 2003, pp. 410-419.
Roy, Jarrod A., et al., "Satisfying Whitespace Requirements in Top-down Placement," ISPD, pp. 206-208, 2006.
Roy Jarrod A., et al., "Fine Control of Local Whitespace in Placement," VLSI design 2008, 11 pages.
Li, Chen, et al., "Routability-driven Placement and White Space Allocation," Proceedings of the 2004 IEEE/ACM International Conference on Computer-aided Design, pp. 394-401, IEEE Computer Society, 2004.

* cited by examiner

*Primary Examiner* — Bryce M Aisaka
(74) *Attorney, Agent, or Firm* — Scully, Scott, Murphy & Presser, P.C.; Daniel P. Morris

(57) ABSTRACT

A method for enhancing routability in a cell-based design includes: obtaining a layout corresponding to a placement of cells in the cell-based design; identifying one or more areas of the layout where routability is predicted to be constrained; selectively adding white spaces to the identified one or more areas of the layout where routability is predicted to be constrained to thereby generate a modified layout; legalizing placement of the modified layout; and running a detailed routing on the modified layout.

20 Claims, 12 Drawing Sheets

FIG. 3

| KNOBS | Base1 | Cong85 | Cong90 | Cong94 | Cong95 |
|---|---|---|---|---|---|
| AREA (ICELLS) | 979956 | 972540 | 972034 | 972034 | 971496 |
| WIRE LENGTH (TRACKS) | 29631975 | 29865912 | 29496449 | 29408577 | 29438361 |
| WIRE LENGTH (MICRONS) | 1383239 | 1396398 | 1378320 | 1374175 | 1375728 |
| TRIM OPENS | 364 | 66 | 105 | 75 | 161 |
| ROUTE SHORTS (CLOCK) | 11 | 0 | 0 | 0 | 0 |
| ROUTE SHORTS (SIGNAL) | 2222 | 443 | 504 | 486 | 748 |
| ROUTE SHORTS (PWRGND) | 0 | 0 | 0 | 0 | 0 |
| TRIM SHORTS | 135 | 38 | 46 | 46 | 76 |
| DRC ERRORS | 15774 | 15737 | 14097 | 13781 | 14108 |
| NETS | 119573 | 118748 | 118754 | 118701 | 118720 |
| GATES | 320875 | 321809 | 320493 | 319602 | 319733 |

FIG. 8

| KNOBS | BASELINE | SHORT10 | SHORT0 | SHORT20 |
|---|---|---|---|---|
| AREA (ICELLS) | 979956 | 971636 | 971348 | 971176 |
| WIRE LENGTH (TRACKS) | 29639171 | 29413993 | 29402271 | 29470462 |
| WIRE LENGTH (MICRONS) | 1383588 | 1374082 | 1373957 | 1376664 |
| ROUTE SHORTS (CLOCK) | 9 | 0 | 4 | 0 |
| ROUTE SHORTS (SIGNAL) | 2074 | 812 | 1053 | 1140 |
| ROUTE SHORTS (PWRGND) | 0 | 0 | 0 | 0 |
| TRIM SHORTS | 153 | 72 | 63 | 95 |
| DRC ERRORS | 15514 | 13972 | 14626 | 14348 |
| NETS | 119573 | 118685 | 118717 | 118603 |
| GATES | 320875 | 318964 | 318852 | 318901 |

WHITE SPACE INSERTION

FIG. 11

| KNOBS | BASELINE | PIN65 | PIN70 | PIN75 | PIN80 | PIN85 |
|---|---|---|---|---|---|---|
| AREA (ICELLS) | 979956 | 972288 | 972322 | 972662 | 972358 | 972152 |
| WIRE LENGTH (TRACKS) | 29635714 | 29604525 | 29467984 | 29538465 | 29488410 | 29474642 |
| WIRE LENGTH (MICRONS) | 1383423 | 1383379 | 1377003 | 1380340 | 1377912 | 1377088 |
| ROUTE SHORTS (CLOCK) | 9 | 4 | 3 | 0 | 0 | 0 |
| ROUTE SHORTS (SIGNAL) | 2568 | 704 | 671 | 628 | 794 | 746 |
| ROUTE SHORTS (PWRGND) | 0 | 0 | 0 | 0 | 0 | 0 |
| TRIM SHORTS | 130 | 59 | 54 | 40 | 49 | 58 |
| DRC ERRORS | 16166 | 15669 | 15168 | 14682 | 14499 | 14108 |
| NETS | 119573 | 118742 | 118723 | 118803 | 118804 | 118729 |
| GATES | 320875 | 318183 | 318444 | 319130 | 319193 | 319575 |

1102 — BASELINE; 1104 — PIN65; 1106 — PIN70; 1108 — PIN75; 1110 — PIN80; 1112 — PIN85

WHITE SPACE INSERTION

1100

WHITE SPACE INSERTION FOR ENHANCED ROUTABILITY

BACKGROUND

The present invention relates generally to the electrical, electronic and computer arts, and, more particularly, to reducing routing congestion in electronic design automation placement and routing.

Chip designs including millions of elementary devices, called standard cells, and a few hundred or thousand more complex building blocks (macros) are often placed on a restricted layout area, connected with each other, with a power supply, and with the "outside world" via primary inputs and outputs of the chip. These standard cells must be synchronized with each other by feeding clock signals and/or other control signals to each of them, and optimized with respect to timing, power consumption and other metrics, such as manufacturing yield, which can be significantly affected by how the devices and wires connecting the cells are arranged in the physical design.

With regard to arranging wires connecting the cells and devices in a design, achieving auto-routability is an important objective in modern standard-cell placement. As a result of technology scaling and corresponding increased design density, however, more cells are being packed into smaller areas while routing resources remain essentially the same. This leads to more severe routing congestion, which has become a dominant indicator of routability in placement for large, tight designs.

Several known approaches have been proposed to alleviate the congestion problem. These known approaches generally involve spreading cells based on congestion estimation. However, in these known approaches, no local region or cell alignment is applied.

SUMMARY

The present invention, as manifested in one or more embodiments thereof, beneficially provides techniques for enhancing routability in a standard-cell placement by inserting white spaces in select congested regions where routability is a concern. Insertion of white spaces in these select congested regions forces local cell alignment to provide additional metal (e.g., M0 and M1 layers) routing resources.

In accordance with an embodiment of the invention, a method for enhancing routability (e.g., by reducing routing congestion) in a cell-based semiconductor design includes: obtaining a layout corresponding to a placement of cells in the cell-based design; identifying one or more areas of the layout where routability is predicted to be constrained; selectively adding white spaces to the identified one or more areas of the layout where routability is predicted to be constrained to thereby generate a modified layout; legalizing placement of the modified layout; and running a detailed routing on the modified layout.

In accordance with an embodiment of the invention, an apparatus for enhancing routability in a cell-based semiconductor design includes memory and one or more processors coupled with the memory. The one or more processors are configured: to obtain an initial layout corresponding to a placement of cells in the cell-based design; to identify one or more areas of the initial layout where routability is predicted to be constrained; to selectively add white spaces to the identified one or more areas of the initial layout where routability is predicted to be constrained to thereby generate a modified layout; to legalize placement of the modified layout; and to run a detailed routing on the modified layout.

As may be used herein, "facilitating" an action includes performing the action, making the action easier, helping to carry out the action, or causing the action to be performed. Thus, by way of example only and without limitation, in the context of a semiconductor fabrication methodology, steps performed by one entity might facilitate an action carried out by another entity to cause or aid the desired action(s) to be performed. For the avoidance of doubt, where an actor facilitates an action by other than performing the action, the action is nevertheless performed by some entity or combination of entities.

Techniques of the present invention can provide substantial beneficial technical effects. By way of example only and without limitation, methods and apparatus for reducing routing congestion in a semiconductor design according to embodiments of the invention may provide one or more of the following advantages:

- reduces the number of opens, shorts and design rule check (DRC) violations in a chip layout design;
- provides a highly flexible approach which can utilize different types of local routability prediction methods;
- compatible with existing electronic design automation (EDA) placement and routing tools.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein:

FIG. 3 is a table including simulated routing results after detailed routing is performed for an exemplary 7-nanometer (nm) chip design using white space insertion based on a global routing congestion map, according to an embodiment of the present invention;

FIG. 8 is a table including simulated routing results after detailed routing is performed for an exemplary 7-nm design employing white space insertion based on a short distribution map, according to an embodiment of the present invention;

FIG. 11 is a table including simulated routing results after detailed routing is performed for an exemplary 7-nm design employing white space insertion based on a pin density map, according to an embodiment of the present invention;

Figure 1A:
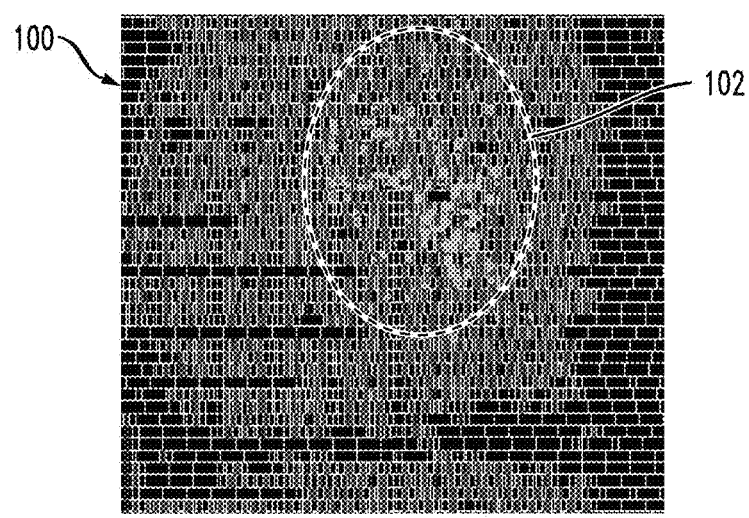
FIGS. 1A and 1B are routing maps that conceptually illustrate an exemplary cell-based chip layout design before and after white space insertion, respectively, according to one or more embodiments of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present invention, as manifested in one or more embodiments thereof, will be described herein in the context of illustrative methods and apparatus for beneficially reducing routing congestion and design rule check (DRC) violations in a cell-based (e.g., fixed-die standard cell) semiconductor layout by inserting white spaces in select regions of the semiconductor layout where routability is estimated to be constrained. It is to be appreciated, however, that the invention is not limited to the specific methods and/or apparatus illustratively shown and described herein. Rather, it will become apparent to those skilled in the art given the teachings herein that numerous modifications can be made to the embodiments shown that are within the scope of the claimed invention. That is, no limitations with respect to the embodiments shown and described herein are intended or should be inferred.

When implementing a cell-based chip design in silicon, after placement, a routing process determines the precise paths for nets on the chip layout to interconnect with pins (i.e., nodes) in the cells. These paths must satisfy certain design rules provided by chip foundries to ensure that the design is properly fabricated. A primary objective in performing the routing process is to complete all required connections without generating any short circuits, referred to herein as shorts. Other criteria may include reducing routing wire lengths, ensuring timing budgets, etc. To handle the complexity of the routing process, a two-stage approach to routing is typically employed, which involves performing global routing followed by detailed routing. Global routing first partitions the routing region into tiles and determines tile-to-tile paths for all nets in the design, whereas detailed routing determines the exact tracks and vias for the nets; global routing is thus more granular compared to detailed routing. Detailed routing is highly complex and extremely time-consuming, and therefore an objective of embodiments of the invention is to achieve enhanced routability in a chip design while minimizing the number of detailed routing runs that are required.

As previously stated, auto-routability is an important aim in modern standard-cell placement. As a result of technology scaling and increased design density, however, more cells are being packed into smaller areas while routing resources remain essentially the same. This leads to more severe routing congestion, which has become a dominant indicator of routability in placement for large, tight designs.

In a cell-based chip design, M0 and M1 metal routing layers are reserved for standard cells and are typically not usable by a detailed router. Interconnections between standard cells are typically made using M2 or higher metal layers. White space allocation is one way to alleviate congestion issues in cell-based placement, used either alone or in conjunction with other congestion management techniques. Whenever there are local routability issues, embodiments of the invention adjust cell placements by adding white spaces (also known as white stripes) so that routing tracks are available for the detailed router, even in M0 and M1 layers.

In cell-based designs, such as standard cell, white spaces generally refer to empty spaces in the design that are not occupied by the standard cells; these empty spaces are reserved for subsequent routing, to allow more room for local wires. Although increasing white spaces in a cell-based design can reduce routing congestion, a trade-off is reduced cell density, which can be undesirable in that it typically leads to an increase in chip area. Therefore, aspects of the present invention, as manifested in one or more embodiments thereof, provide techniques for white space insertion in a cell-based placement that optimizes routing congestion without significantly impacting density or increasing chip area. To achieve this objective, one or more embodiments of the invention beneficially inserts white spaces in select local regions of the cell-based design layout where routability is a concern.

Figure 1B:
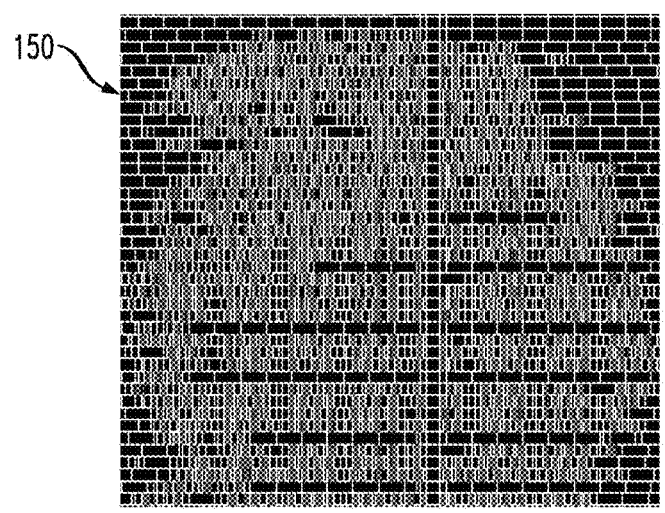

FIGS. 1A and 1B are routing maps that conceptually illustrate an exemplary cell-based chip layout design before and after white space insertion, respectively, according to one or more embodiments of the invention. As apparent from FIG. 1A, an exemplary chip layout design 100 is shown which includes several shorts, depicted as regions of white clusters 102 in the routing map. These shorts are attributable to routing errors (e.g., DRC violations) and are generally indicative of areas having high local routing congestion. FIG. 1B illustrates an exemplary chip layout design 150 which is essentially the same as the chip layout design 100 depicted in FIG. 1A after white space insertion according to embodiments of the invention. As apparent from FIG. 1B, the shorts have been advantageously eliminated, thereby implying reduced local routing congestion, without increasing the chip layout area.

Figure 2:
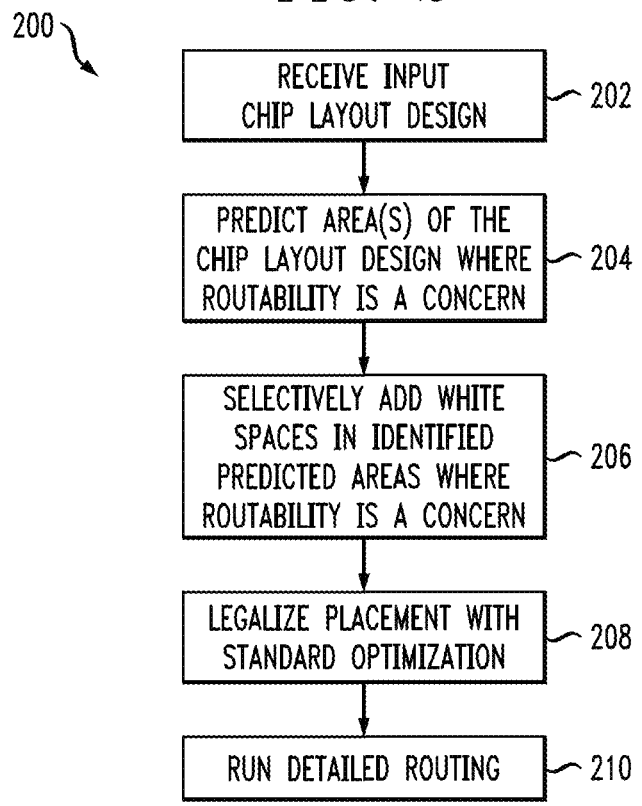
FIG. 2 is a flow diagram depicting at least a portion of an exemplary method for enhancing routability in a cell-based design, according to an embodiment of the present invention.

By way of example only and without limitation, FIG. 2 is a flow diagram depicting at least a portion of an exemplary method 200 for enhancing routability in a cell-based design, according to an embodiment of the invention. The method 200, in one or more embodiments, achieves enhanced routability in a cell-based chip design by employing a two-part approach: namely, (i) identifying areas in the chip placement that are predicted to have high routing congestion; and (ii) using the routing congestion prediction information to change the chip placement in a minimal way so that routing congestion is reduced while minimizing the perturbation of the chip placement from the original placement solution.

The illustrative method 200 begins in step 202 by receiving, as input, the original placement solution (i.e., layout) for a given chip design to be optimized. The layout is assumed to be a legal placement. A legal placement, as the term is used herein, is intended to refer broadly to a layout design wherein there is no overlap between cells, and all cells are aligned along circuit rows in a horizontal (or vertical) direction; a circuit row is defined by the height of the cells, which for a standard cell design is generally fixed.

In step 204, the method predicts one or more areas of the chip layout design where routability is a concern; for example, an area or areas of the layout that contain DRC violations and/or areas which contain a number of shorts exceeding a prescribed threshold value. Embodiments of the invention contemplate various methods for performing this routability congestion prediction 204, including, but not limited to, global routing congestion analysis, pin-density map-based analysis, and short distribution map-based analysis. One or more of these exemplary prediction methods (e.g., short-distribution map-based analysis), which will be discussed in further detail herein below, is obtained after running a detailed routing on the chip placement. Running a detailed routing, however, is significantly time-consuming, and therefore embodiments of the invention beneficially seek to reduce the runtime as well as the number of times the detailed routing is run.

Once a prediction is made in step 204 identifying one or more areas of the chip layout design where routability is a concern, white spaces are selectively added in those identified areas of predicted local routability congestion in step 206. By limiting the insertion of white spaces to only those selected areas of predicted routability concern, a change in the placement from its original placement solution is advantageously minimized. After selectively inserting white spaces in step 206, the method legalizes the chip placement using standard optimization techniques in step 208. A detailed routing is then run in step 210 to accurately verify the new placement solution.

As previously stated, predicting areas of the chip placement where routability is a concern (step 204 in FIG. 2) can be achieved in a number of different ways. Although three exemplary congestion prediction approaches that are suitable for use with the invention will be described herein in further detail, it is to be appreciated that embodiments of the invention are not limited to any particular prediction methodology.

In a first illustrative embodiment, white spaces are selectively inserted into the chip design (step 206 in FIG. 2) based on a global routing congestion map (e.g., Bonn global routing). A global routing congestion map provides a representation of the estimated routing congestion for a given design; higher congestion numbers refer to areas of higher routing congestion. Running a global routing on the overall design is considerably less time consuming compared to running a detailed routing on the design, with a trade-off being an accuracy of the routing results.

A global routing congestion map is a congestion estimation that can be generated by dividing a chip placement design into tiles, and congestion is determined per tile. That is, a grid is preferably placed on the overall design and congestion is calculated based on the total number of wires that each tile can hold. Based on global routing information for the design, it is then determined how many wires pass through each tile. The percentage of wires passing through a given tile divided by the total capacity of that tile yields an estimated congestion number for that tile.

Based on the congestion map and corresponding congestion number assigned to each of the tiles in the design, different global routing thresholds are used to modulate the amount of white spaces inserted into the design. More particularly, in one or more embodiments, different global routing thresholds are set, such as, for example, 85 percent, 90 percent, and 95 percent, although embodiments of the invention are not limited to the number of thresholds employed or the specific values of the thresholds. When the congestion map indicates that the estimated congestion number for a given tile exceeds the prescribed threshold, white spaces are added to that tile to create empty space for enhanced routability through the tile. This process is repeated for each tile in the design. In this manner, only areas of predicted high congestion in the design will have white spaces added, thus minimizing the extent of modification to the original design.

In one or more embodiments, whites spaces in the form of one horizontal stripe and/or one vertical stripe are added to a tile having an estimated congestion number which exceeds the prescribed routing threshold. It is to be appreciated that embodiments of the invention are not limited to this form of white space insertion. For example, in one or more alternate embodiments, multiple horizontal and/or multiple vertical stripes can be inserted into the tile to provide sufficient routing space as desired. If the estimated congestion number does not exceed the prescribed routing threshold, no white spaces are added to the tile; that is, the tile is left unmodified. After white space insertion, placement legalization is performed (step 208 in FIG. 2) and a detailed routing is then run (step 210 in FIG. 2).

For example, based on global routing information, when the number of wires through a given tile of the design is at 86 percent of the total capacity for that tile and the routing threshold is set to 85 percent, white spaces will be added to that tile. Given the same estimated congestion number and a routing threshold of 90 percent, no white spaces will be added to the tile since the congestion number does not exceed the 90 percent threshold.

Optionally, optimization may be performed on the design prior to running the detailed routing (e.g., to reduce wire lengths, reduce the number of nets, etc.). Optimization may be desirable depending on the application in which the chip is being used. For example, in a high-frequency application, it is often beneficial to reduce the wire lengths in the design. The enhanced routability techniques according to embodiments of the invention are well-suited for use in conjunction with other known optimization tools (e.g., placers).

Embodiments of the invention even contemplate that multiple routing thresholds can be employed. In this manner, the amount of white space added to a tile can be adjusted based on the estimated congestion in that tile. For example, consider an illustrative embodiment in which two routing thresholds are used: an upper routing threshold (e.g., 95 percent) and a lower routing threshold (e.g., 85 percent). When the estimated congestion in a given tile exceeds the lower routing threshold but not the upper routing threshold, a first amount of white space is added to the tile. When the estimated congestion in the tile exceeds the upper routing threshold, a second amount of white space is added to the tile, the second amount being greater than the first amount. The amount of white space added to a tile may be adjusted, for example, by modifying a width of the stripes, modifying the number of stripes, etc., as will become apparent to those skilled in the art.

By way of example only and without limitation, FIG. 3 is a table 300 including simulated routing results after detailed routing is performed for an exemplary 7-nanometer (nm) design using white space insertion based on a global routing congestion map, according to an embodiment of the invention. In the table 300, various design parameters (e.g., area, wire length (tracks), wire length (microns), trim opens, route shorts (clock), route shorts (signal), route shorts (power/ ground supply), trim shorts, DRC errors, nets, gates) are presented for five different chip designs after detailed routing: an original/baseline design, without any white space insertion (Basel) 302; a design utilizing white space insertion with routing threshold set at 85 percent (Cong85) 304; a design utilizing white space insertion with routing threshold set at 90 percent (Cong90) 306; a design utilizing white space insertion with routing threshold set at 94 percent (Cong94) 308; and a design utilizing white space insertion with routing threshold set at 95 percent (Cong95) 310. Each of the modified designs has certain trade-offs, but one parameter that is especially indicative of routing congestion is signal route shorts 312.

As apparent from FIG. 3, the number of signal route shorts in the original design is 2222. Each of the white space insertion designs provides a lower number of signal route shorts compared to the original design, but the reduction in the number of shorts is not necessarily linear or even monotonic. For example, with the routing threshold set at 85 percent for white space insertion, the design has 443 signal route shorts. Intuitively, the number of shorts would be expected to go up as the routing threshold is set higher, but this is not the case in this example. Instead, the number of signal route shorts in the design when the routing threshold is set at 94 percent is actually lower (486) compared to the number of signal route shorts when the routing threshold is set at 90 percent (504). Also, the number of DRC errors is the lowest when the routing threshold is set at 94 percent, even though the least number of signal route shorts is found in the design with the routing threshold set at 85 percent. This highlights the fact that a plurality of different routing thresholds should be used, to thereby modulate the amount of white space that is inserted into the designs, and multiple design parameters of interest should be compared in selecting an optimal routing threshold for a given design and/or application.

As is evident from the table of FIG. 3, none of the exemplary white space insertion scenarios according to embodiments of the invention is effective at reducing the number of shorts to zero. However, each of the white space insertion scenarios 304 through 310 achieves a significant reduction in the number of shorts, which provides a better starting point for the subsequent detailed routing. That is, reducing the number of shorts advantageously reduces the burden placed on the detailed routing since there are less routing problems to resolve in the design. This reduced burden on the detailed routing translates to a significant savings in computational time.

With continued reference to FIG. 3, using the white space insertion methodology according to embodiments of the invention, the design area is not significantly impacted compared to the original design. In fact, the overall area actually decreases for any of the designs that incorporate white space insertion compared to the original design without white space insertion. This is indicative of a more efficient wire routing in areas of predicted high routing congestion.

Figure 4A:
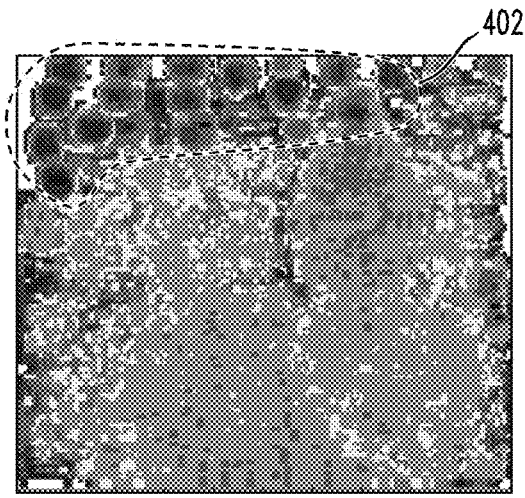
FIGS. 4A and 4B conceptually illustrate a reduction in routing congestion for an original (baseline) design without white space insertion compared to an illustrative modified design using white space insertion based on a routing congestion map, according to embodiments of the present invention.
Figure 4B:
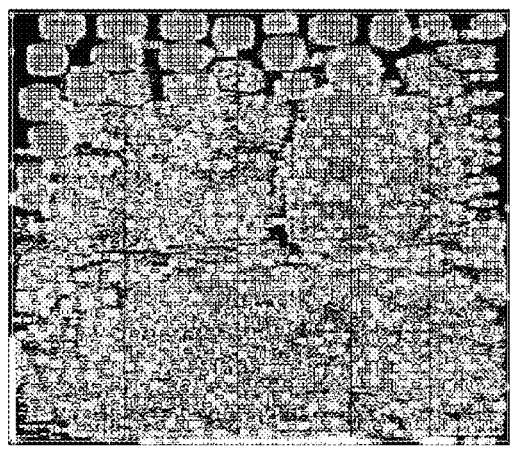

FIGS. 4A and 4B conceptually illustrate a reduction in routing congestion for an exemplary original (baseline) design without white space insertion compared to an illustrative modified design using white space insertion based on a routing congestion map, according to embodiments of the invention. Specifically, FIG. 4A depicts an exemplary routing congestion map for an original (i.e., baseline) design without white space insertion. As shown in FIG. 4A, the congestion map indicates an area 402 of the design where tiles are predicted to have high routing congestion. FIG. 4B illustrates an exemplary layout for a modified design using white space insertion based on a selected routing threshold of 85 percent; routing thresholds of 90 percent, 94 percent and 95 percent will provide comparable layout results. As apparent from FIG. 4B, after white space insertion, black horizontal and vertical lines (indicative of inserted white stripes) can be seen primarily in the predicted high routing congestion area 402. Advantageously, the layout shown in FIG. 4B, while reducing routing congestion in the predicted highly congested area 402, does not noticeably increase the layout area compared to the design without white space insertion corresponding to the congestion map of FIG. 4A.

Figure 5A:
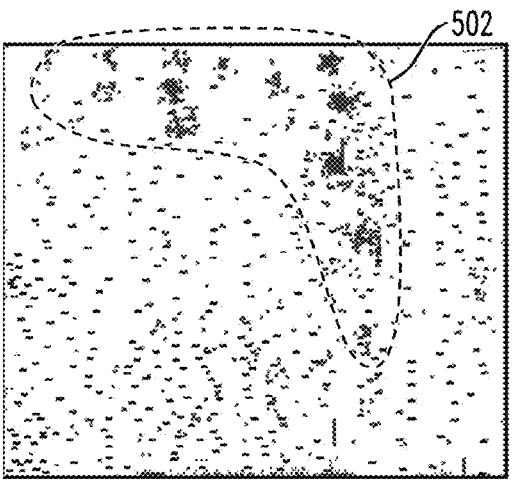
FIGS. 5A and 5B are exemplary short distribution maps which conceptually illustrate a reduction in the number of shorts for an original (baseline) design without white space insertion compared to an illustrative modified design using white space insertion based on a routing congestion map, according to embodiments of the present invention.
Figure 5B:
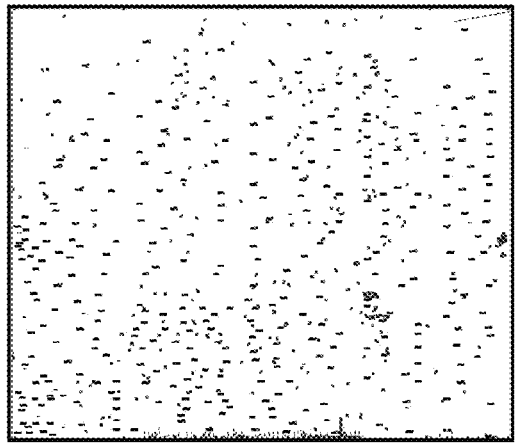

FIGS. 5A and 5B are exemplary short distribution maps which conceptually illustrate a reduction in the number of shorts for an original (baseline) design without white space insertion compared to an illustrative modified design using white space insertion based on a routing congestion map, according to embodiments of the invention. FIG. 5A depicts an exemplary short distribution map for the original design without white space insertion. As shown in FIG. 5A, the short distribution map indicates an area 502 of the design estimated to have a high number of shorts. FIG. 5B illustrates a short distribution map for the design using white space insertion based on a selected routing threshold of 85 percent; routing thresholds of 90 percent, 94 percent and 95 percent will provide comparable layout results. As apparent from FIG. 5B, the number of shorts is substantially reduced using white space insertion compared to the original design shown in FIG. 5A without white space insertion.

In a second illustrative embodiment, white spaces are selectively inserted into the chip design (step 206 in FIG. 2) based on a short distribution map. A short distribution map can be obtained, in one or more embodiments, from prior detailed routing runs on the design. Like in the routing congestion map approach previously described, the short distribution map approach involves partitioning the chip design into a grid. Specifically, white space insertion is determined, in one or more embodiments, by reading a short location report of the design generated by the detailed routing. The chip design is then partitioned into a grid of tiles, and the number of shorts in each tile is determined. In one or more embodiments, a user may control the size of each tile. Preferably, for consistency, the size of each tile is set to the default tile size used for the routing congestion map. Optionally, when a short falls on a boundary between adjacent tiles, embodiments of the invention may calculate the short overlap percentage within each tile. However, this level of accuracy is generally not required since the primary objective is merely to identify the major problematic regions in the design.

Figure 6:
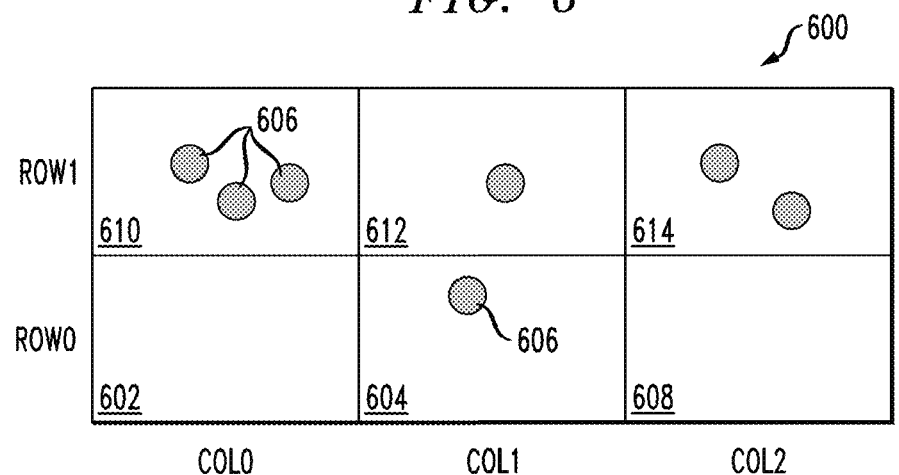
FIG. 6 conceptually illustrates at least a portion of an exemplary chip design partitioned into a grid depicting short locations obtained from the short distribution map, according to an embodiment of the present invention.

FIG. 6 conceptually illustrates at least a portion of an exemplary chip design partitioned into a grid depicting short locations obtained from the short distribution map, according to an embodiment of the invention. In this example, the chip design has been partitioned into a grid including at least two rows, designated "Row0" and "Row1," and at least three columns, designated "Col0" "Col1," and "Col2," although embodiments of the invention are not limited to any specific number of rows and/or columns in the partition of the chip design. Each tile in the grid can be identified according to its unique combination of row and column location. Shorts are distributed throughout the various tiles based on the short distribution map. In this example, tile 602, at Row0, Col0, contains no shorts, tile 604, at Row0, Col1, contains one short 606, tile 608, at Row0, Col2, contains no shorts, tile 610, at Row1, Col0, contains three shorts, tile 612, at Row1, Col1, contains one short, and tile 614, at Row1, Col2, contains two shorts.

Figure 7:
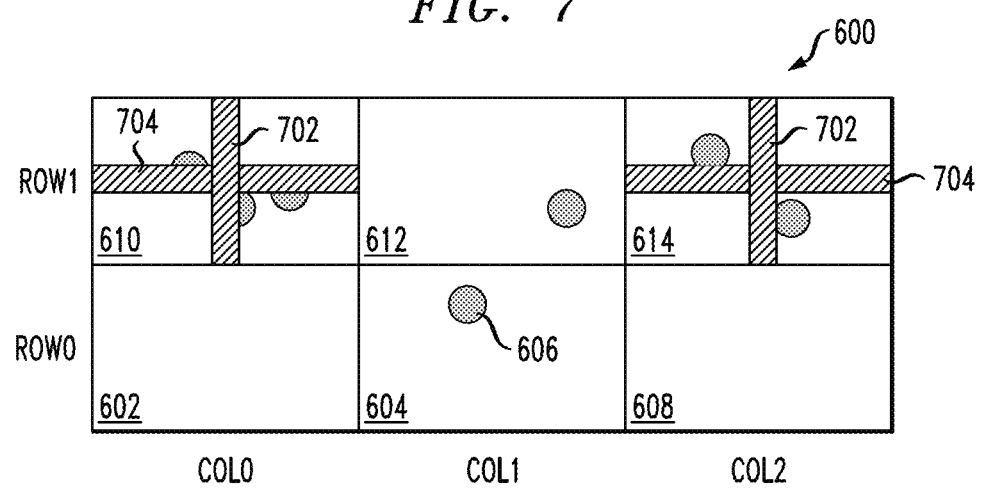
FIG. 7 conceptually depicts the chip design partition shown in FIG. 6 after white space insertion, according to an embodiment of the present invention.

Next, a short count threshold is selected; white space insertion is based on this threshold. The short count threshold is indicative of a desired maximum number of shorts for each of the plurality of tiles in the layout. In this example, a short count threshold of one is chosen. For any tile that contains a number of shorts exceeding this selected threshold value, white space is added. Thus, since tiles 610 and 614 each contain more than one short, white space will be added to these tiles. FIG. 7 conceptually depicts the chip design partition shown in FIG. 6 after white space insertion, according to an embodiment of the invention. With reference to FIG. 7, in a manner consistent with the congestion map approach previously described, white space may be added to a given tile in the form of one or more vertical stripes 702 and/or one or more horizontal stripes 704. In this example, since tiles 610 and 614 contain shorts exceeding the prescribed short count threshold of one, a vertical stripe 702 and a horizontal stripe 704 are added to each of these tiles.

FIG. 8 is a table 800 including simulated routing results after detailed routing is performed for an exemplary 7-nm design employing white space insertion based on a short distribution map, according to an embodiment of the invention. In the table 800, various design parameters (e.g., area (Icells), wire length (tracks), wire length (microns), route shorts (clock), route shorts (signal), route shorts (power/ground supply), trim shorts, DRC errors, nets, gates) are presented for four different chip designs after detailed routing: an original/baseline design, without any white space insertion (Baseline) 802; a design utilizing white space insertion with short count threshold set at 10 shorts per tile (short10) 804; a design utilizing white space insertion with short count threshold set at zero shorts per tile (short0) 806; and a design utilizing white space insertion with short count threshold set at 20 shorts per tile (short20) 808. Each of the modified designs has certain trade-offs, but one parameter that is especially indicative of routing congestion is signal route shorts.

As apparent from table 800, the number of signal route shorts in the original design is 2074. Each of the white space insertion designs provides a lower number of signal route shorts compared to the original design, but, like the routing congestion map approach previously described in conjunction with table 300 shown in FIG. 3, the reduction in the number of shorts is not necessarily linear or even monotonic. For example, with the short count threshold set at 10 for white space insertion, the design has 812 signal route shorts. Intuitively, the number of shorts would be expected to go down as the short count threshold is set lower, but that is not the case in this example. Instead, the number of signal route shorts in the design when the short count threshold is set at zero is actually higher (1053) compared to the number of signal route shorts when the routing threshold is set at 10 (812). Furthermore, the number of DRC errors is the lowest when the routing threshold is set at 10, even though the minimum total wire length and minimum cell area is found in the design with the short count threshold set at zero. Thus, different parameters of interest may be optimized for different short count thresholds. This highlights the fact that a plurality of different short count thresholds should be used, to thereby modulate the amount of white space that is inserted into the designs, and multiple design parameters of interest should be compared in selecting an optimal short count threshold for a given design and/or application.

As is evident from table 800, like the routing congestion map approach depicted in table 300 of FIG. 3, none of the exemplary white space insertion scenarios according to embodiments of the invention is effective at reducing the number of shorts to zero. However, each of the white space insertion scenarios 804 through 808 achieves a significant reduction in the number of signal shorts, which provides a better starting point for the subsequent detailed routing. As previously explained, reducing the number of shorts advantageously reduces the burden placed on the detailed routing since there are less routing problems to resolve in the design. Again, this reduced burden on the detailed routing translates to a savings in computational time.

With continued reference to FIG. 8, using the white space insertion methodology based on a short distribution map according to embodiments of the invention, the design area is not significantly impacted compared to the original design. In fact, the overall cell area actually decreases for any of the designs that incorporate white space insertion compared to the original design without white space insertion. This is indicative of a more efficient wire routing in areas of predicted high routing congestion.

Figure 9A:
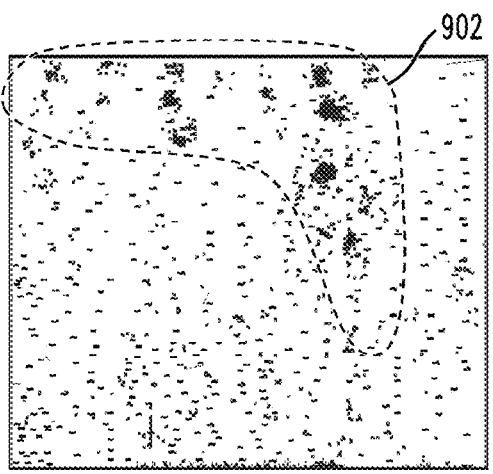
FIGS. 9A and 9B conceptually illustrate a reduction in routing congestion for an exemplary original (baseline) design without white space insertion compared to an illustrative modified design using white space insertion based on a short distribution map, according to embodiments of the present invention.
Figure 9B:
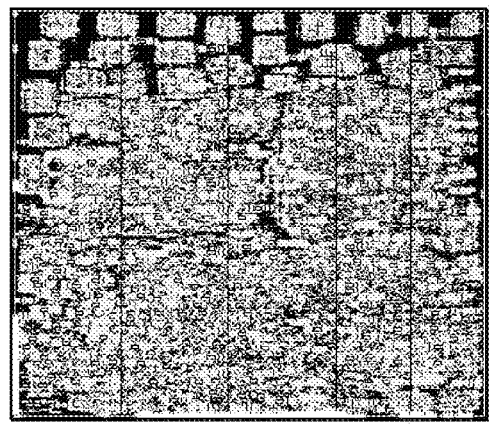

FIGS. 9A and 9B conceptually illustrate a reduction in routing congestion for an exemplary original (baseline) design without white space insertion compared to an illustrative modified design using white space insertion based on a short distribution map, according to embodiments of the invention. Specifically, FIG. 9A depicts an exemplary short distribution map for an original (i.e., baseline) design without white space insertion. As apparent from FIG. 9A, the short distribution map indicates a region 902 of the design in which tiles are estimated to have high routing congestion. FIG. 9B illustrates an exemplary layout for the design using white space insertion based on a selected short count threshold of 10, indicating that white space is added to any tile(s) having more than 10 shorts. As apparent from FIG. 9B, after white space insertion, black horizontal and vertical lines (indicative of inserted white stripes) can be seen primarily in the predicted high routing congestion area 902 (FIG. 9A). The layout shown in FIG. 9B, while reducing routing congestion in the predicted highly congested area 902, does not noticeably increase the layout area compared to the design without white space insertion corresponding to the congestion map of FIG. 9A.

Figure 10A:
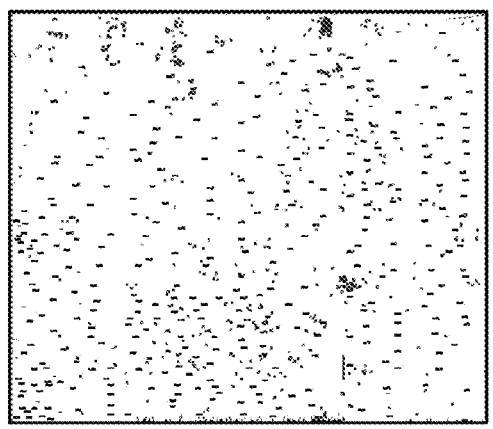
FIGS. 10A and 10B are exemplary short distribution maps which conceptually depict a reduction in the number of shorts using white space insertion based on a short distribution map, according to embodiments of the present invention.
Figure 10B:
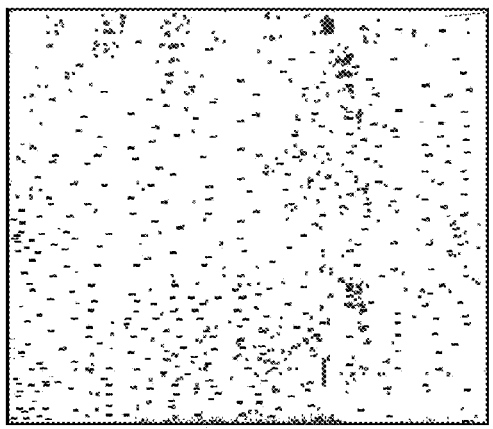

FIGS. 10A and 10B are exemplary short distribution maps which conceptually depict a reduction in the number of shorts using white space insertion based on a short distribution map, according to embodiments of the invention. Compared to the short distribution map for the original/baseline design without white space insertion shown in FIG. 9A, the short distribution maps corresponding to selected short count thresholds of 10 and zero shown in FIGS. 10A and 10B, respectively, achieve a substantial reduction in shorts. Furthermore, the region of shorts 902 shown in FIG. 9A is no longer present in the designs corresponding to FIGS. 10A and 10B, indicating enhanced routability in the designs using white space insertion based on a short distribution map. As previously stated, even though all shorts have not been eliminated using this approach, the detailed routing will have a considerably easier time resolving the remaining shorts and other DRC errors in the design.

In a third illustrative embodiment, white spaces are selectively inserted into the chip design (step 206 in FIG. 2) based on a pin density map. A pin is preferably defined as a physical connection for a net in a standard cell. Like the short distribution map approach previously described, a pin density map can be obtained from prior detailed routing runs for a given chip design and provides a distribution of pins/nodes in the design. Since each node in a cell requires a wire for routing, a large number of pins in a particular area of the design generally correlates to an estimated higher routing congestion in that area. Thus, by selectively inserting white space in targeted areas of the design having high pin density, enhanced routability can be beneficially attained.

In a manner consistent with the short distribution map methodology, the pin density map embodiment involves partitioning the chip design into a grid of tiles, and the number of pins (i.e., nodes) in each tile is determined. In one or more embodiments, a user may control the size of each tile, although preferably the size of each tile is set to the default tile size used for the routing congestion map. Next, a pin count threshold is selected; white space insertion is determined as a function of this threshold. The pin count threshold is indicative of a desired maximum pin density for each of the plurality of tiles in the layout. By way of example only, assuming a prescribed pin count threshold of 70 is selected, white space will be added to any tile having a pin count that exceeds 70 (i.e., 71 and above).

With reference now to FIG. 11, a table 1100 includes simulated routing results after detailed routing is performed for an exemplary 7-nm design employing white space insertion based on a pin density map, according to an embodiment of the invention. In the table 1100, various design parameters (e.g., area (Icells), wire length (tracks), wire length (microns), route shorts (clock), route shorts (signal), route shorts (power/ground supply), trim shorts, DRC errors, nets, gates) are presented for six different chip designs after detailed routing: an original/baseline design, without any white space insertion (Baseline) 1102; a design utilizing white space insertion with pin count threshold set at 65 pins per tile (Pin65) 1104; a design utilizing white space insertion with pin count threshold set at 70 pins per tile (Pin70) 1106; a design utilizing white space insertion with pin count threshold set at 75 pins per tile (Pin75) 1108; a design utilizing white space insertion with pin count threshold set at 80 pins per tile (Pin80) 1110; and a design utilizing white space insertion with pin count threshold set at 85 pins per tile (Pin85) 1112. Although each of the modified designs has certain trade-offs, one parameter that is especially indicative of routing congestion is signal route shorts.

As shown in table 1100, the number of signal route shorts in the original design is 2568. Each of the white space insertion designs provides a significantly lower number of signal route shorts compared to the original design, but, like the routing congestion map and short distribution map approaches previously described in conjunction with table 300 shown in FIG. 3 and table 800 shown in FIG. 8, the reduction in the number of shorts is not necessarily linear or even monotonic. For example, with the pin count threshold set at 65 for white space insertion (which has the most amount of white space insertion of the five different scenarios), the design has 704 signal route shorts. Intuitively, the number of shorts would be expected to go down as the pin count threshold is set higher, but that is not the case in this example. Instead, the number of signal route shorts in the design when the pin count threshold is set at 70 is actually lower (671) compared to the number of signal route shorts when the pin count threshold is set at 65. Likewise, with the pin count threshold set at 75, the number of signal route shorts is reduced to 628. But when the pin count threshold is set at 80, the number of signal route shorts increases to 794, and the number of signal route shorts decreases to 746 when the pin count threshold is set to 85. In this example, the minimum number of signal route shorts occurs when the pin count threshold is set at 75. Furthermore, the number of DRC errors appears to decrease monotonically with increasing pin count threshold. Thus, different parameters of interest may be optimized for different pin count thresholds. Again, this highlights the fact that a plurality of different pin count thresholds should be compared, to thereby modulate the amount of white space that is inserted into the design, and multiple design parameters of interest should be reviewed in selecting an optimal pin count threshold for a given design and/or application.

As is evident from table 1100, like the routing congestion map and short distribution map approaches depicted in table 300 of FIG. 3 and table 800 of FIG. 8, respectively, none of the exemplary white space insertion scenarios according to embodiments of the invention which utilize a pin density map is effective at reducing the number of shorts to zero. However, each of the white space insertion scenarios 1104 through 1112 achieves a significant reduction in the number of signal shorts, which provides a better starting point for the subsequent detailed routing, which thereby reduce the burden placed on the detailed routing.

Although each of the methods for determining the amount of white space insertion (e.g., routing congestion map, short distribution map and pin density map) have been described separated, it is to be appreciated that more than one of these approaches can be combined and used either concurrently (i.e., in parallel) or in succession (i.e., in serial) for determining how to selectively add white space to identified areas of the chip design in order to achieve an optimal reduction in wire routing congestion. The approach(es) employed will typically be dependent upon the particular chip design and/or application in which the chip is being used, as will become apparent to those skilled in the art given the teachings herein.

Figure 12A:
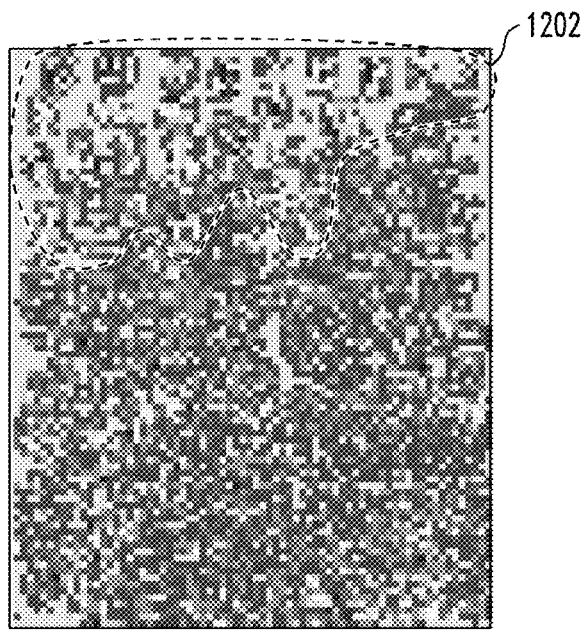
FIGS. 12A and 12B conceptually illustrate a reduction in routing congestion for an original (baseline) design without white space insertion compared to an illustrative modified design using white space insertion based on a pin density map, according to embodiments of the present invention.
Figure 12B:
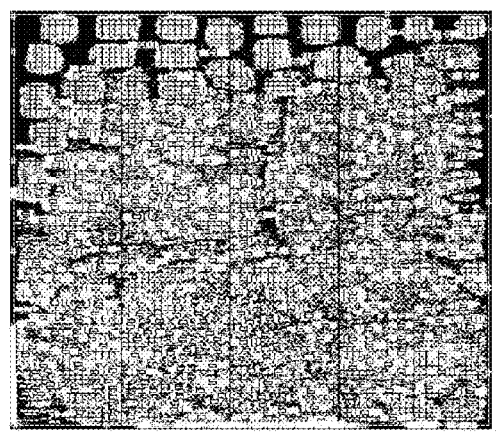

FIGS. 12A and 12B conceptually illustrate a reduction in routing congestion for an original (baseline) design without white space insertion compared to an illustrative modified design using white space insertion based on a pin density map, according to embodiments of the invention. Specifically, FIG. 12A depicts an exemplary pin density map for an original (i.e., baseline) design without white space insertion. As apparent from FIG. 12A, the pin density map indicates regions, for example region 1202, of the design in which tiles are estimated to have higher routing congestion (based on high pin density). FIG. 12B illustrates an exemplary modified layout for the design using white space insertion based on a selected pin count threshold of 65, indicating that white space is added to any tile(s) having more than 65 pins; comparable results may be achieved for white space insertion using pin count thresholds of 70, indicating that white space is added to any tile(s) having more than 70 pins, and 75, indicating that white space is added to any tile(s) having more than 75 pins. It is to be appreciated that embodiments of the invention are not limited to any specific pin count threshold value(s). As apparent from FIG. 12B, after white space insertion, black horizontal and vertical lines (indicative of inserted white stripes) can be seen primarily in the predicted high routing congestion area 1202 based on high pin density. Advantageously, the layout shown in FIG. 12B, while reducing routing congestion in the predicted highly congested area 1202, does not noticeably increase the layout area compared to the design without white space insertion.

Figure 13A:
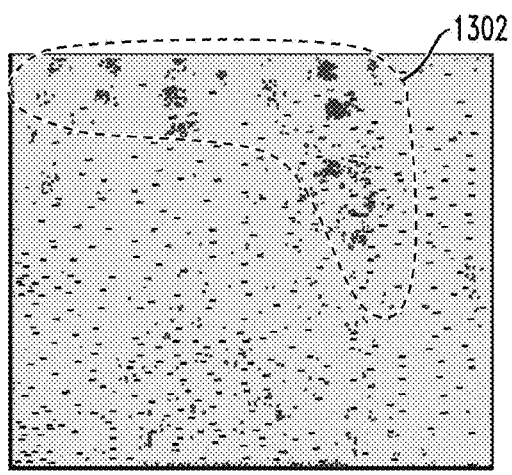
FIGS. 13A and 13B are exemplary short distribution maps which conceptually illustrate a reduction in the number of shorts for the exemplary designs depicted in FIGS. 12A and 12B, respectively, using white space insertion based on a pin density map, according to embodiments of the present invention.
Figure 13B:
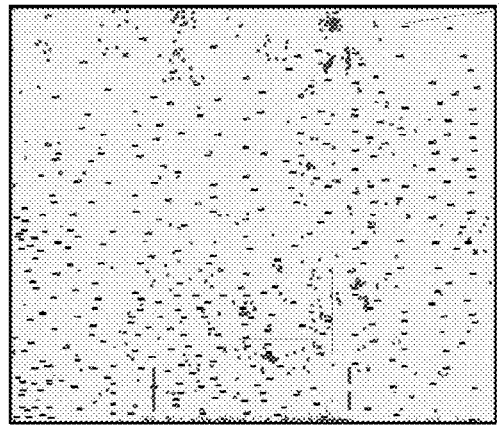

FIGS. 13A and 13B are exemplary short distribution maps which conceptually illustrate a reduction in the number of shorts for the exemplary designs depicted in FIGS. 12A and 12B, respectively, using white space insertion based on a pin density map, according to embodiments of the invention. Compared to the pin density map for the original/baseline design without white space insertion shown in FIG. 13A, the short distribution map corresponding to a selected pin count threshold of 65 shown in FIG. 13B achieves a substantial reduction in the overall number of shorts. Furthermore, region 1302 shown in FIG. 13A having a higher number of shorts, is substantially reduced in size for the modified design corresponding to FIG. 13B, indicating enhanced routability in the modified design utilizing white space insertion based on a pin density map. As previously stated, although all shorts have not been eliminated using this approach, the detailed routing will have a considerably easier time resolving the remaining shorts and other DRC errors in the design.

Figure 14A:
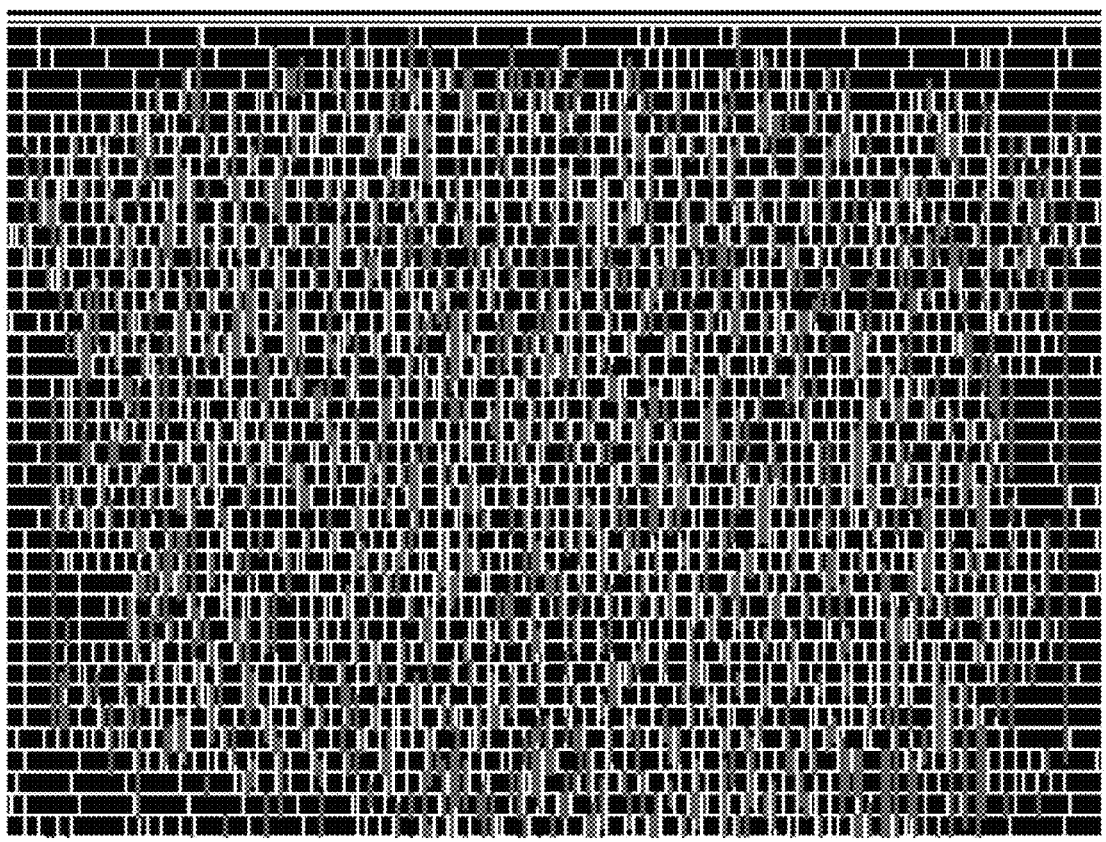
FIGS. 14A and 14B are M1 wire routing floorplans for a chip design conceptually depicting a comparison of the original layout without white space insertion and a layout employing white space insertion, respectively, according to an embodiment of the present invention.
Figure 14B:
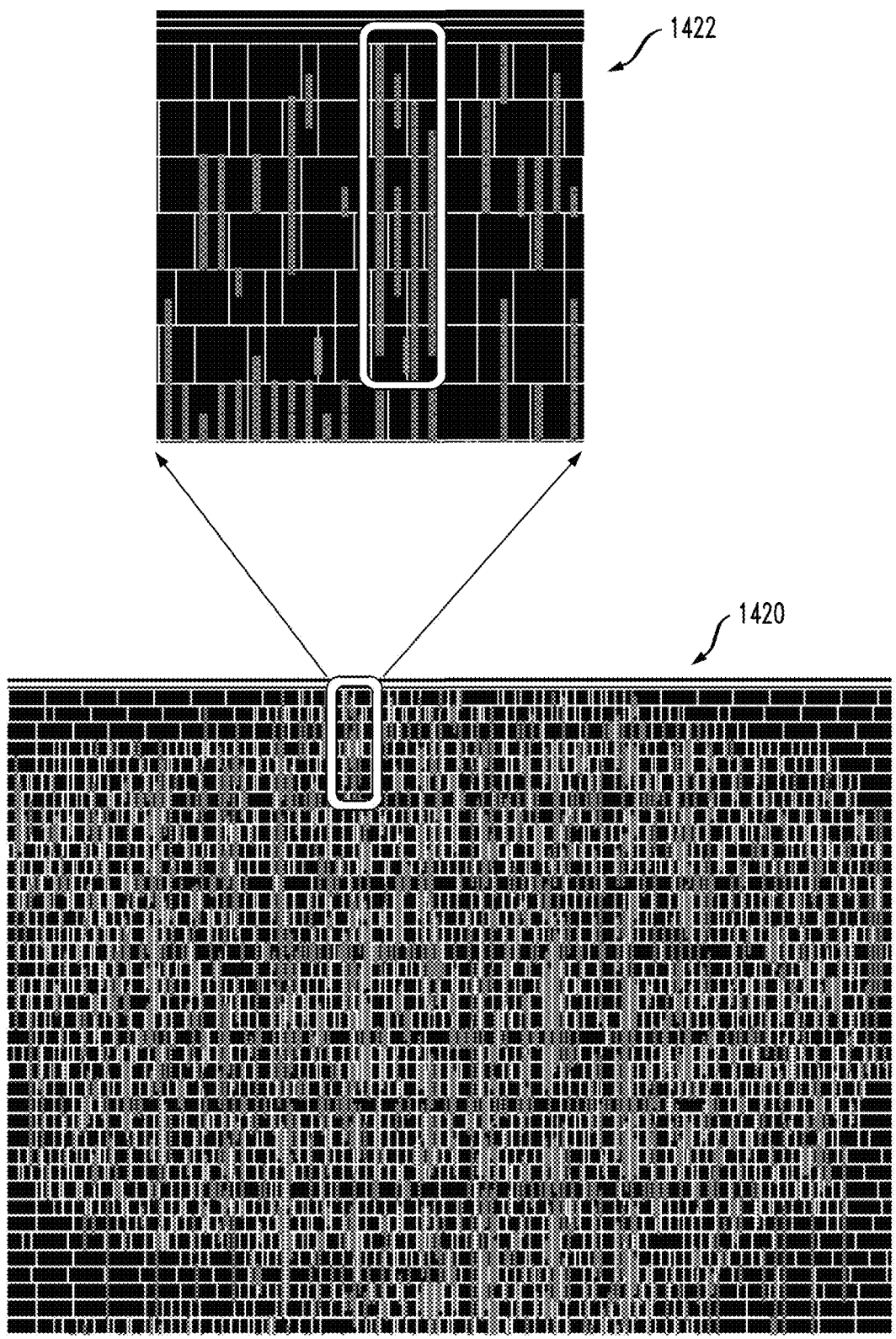

FIGS. 14A and 14B are M1 wire routing layouts for a chip design conceptually comparing the original layout without white space insertion and a layout employing white space insertion, according to an embodiment of the invention. Specifically, FIG. 14A depicts at least a portion of an exemplary original (baseline) chip routing floorplan 1410 that does not employ white space insertion; FIG. 14B depicts an exemplary floorplan 1420 showing the chip design of FIG. 14A after white space has been inserted in select areas of the design using a routing congestion map approach according to aspects of the invention. In this example, a routing threshold is set at 85 percent (Cong85), indicating that white space is added only to tiles in the design having an estimated routing congestion which exceeds 85 percent of the total routing capacity for those tiles.

In comparing the two floorplans shown in FIGS. 14A and 14B, it is apparent that the chip design after white space insertion shown in FIG. 14B includes more and longer M1 wires used in the routing. A magnified view 1422 of a portion of the floorplan illustrates M1 routing wires extending vertically across multiple rows of cells. This is indicative of the additional space inserted in certain areas of the design to allow for easier wire routing through cells.

Embodiments of the invention may be implemented together with virtually any type of computer, regardless of the platform being suitable for storing and/or executing program code. By way of example only and without limitation, FIG. 15 is a block diagram depicting at least a portion of an illustrative computing system 1500 suitable for executing program code related to the proposed method(s) for enhancing routability in a cell-based design.

The computing system 1500 is only one example of a suitable computer system and is not intended to suggest any limitation as to the scope of use or functionality of embodiments of the invention described herein, regardless, whether the computer system 1500 is capable of being implemented and/or performing any of the functionality set forth hereinabove. In the computer system 1500, there are components, which are adapted for connection to and operational with numerous other general-purpose or special-purpose computing system environments or configurations. Examples of well-known computing systems, environments, and/or configurations that may be suitable for use with computer system 1500 include, but are not limited to, personal computer systems, server computer systems (i.e., servers), thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The computer system 1500 may be described in the general context of computer system-executable instructions, such as program modules, being executed by the computer system 1500. Generally, program modules may include routines, programs, objects, components, logic, data structures, and so on that perform particular tasks or implement particular abstract data types. The computer system 1500 may be practiced in distributed cloud computing environments where tasks are performed by remote processing devices that are linked through a communications network. In a distributed cloud computing environment, program modules may be located in both local and remote computer system storage media, including memory storage devices.

Figure 15:
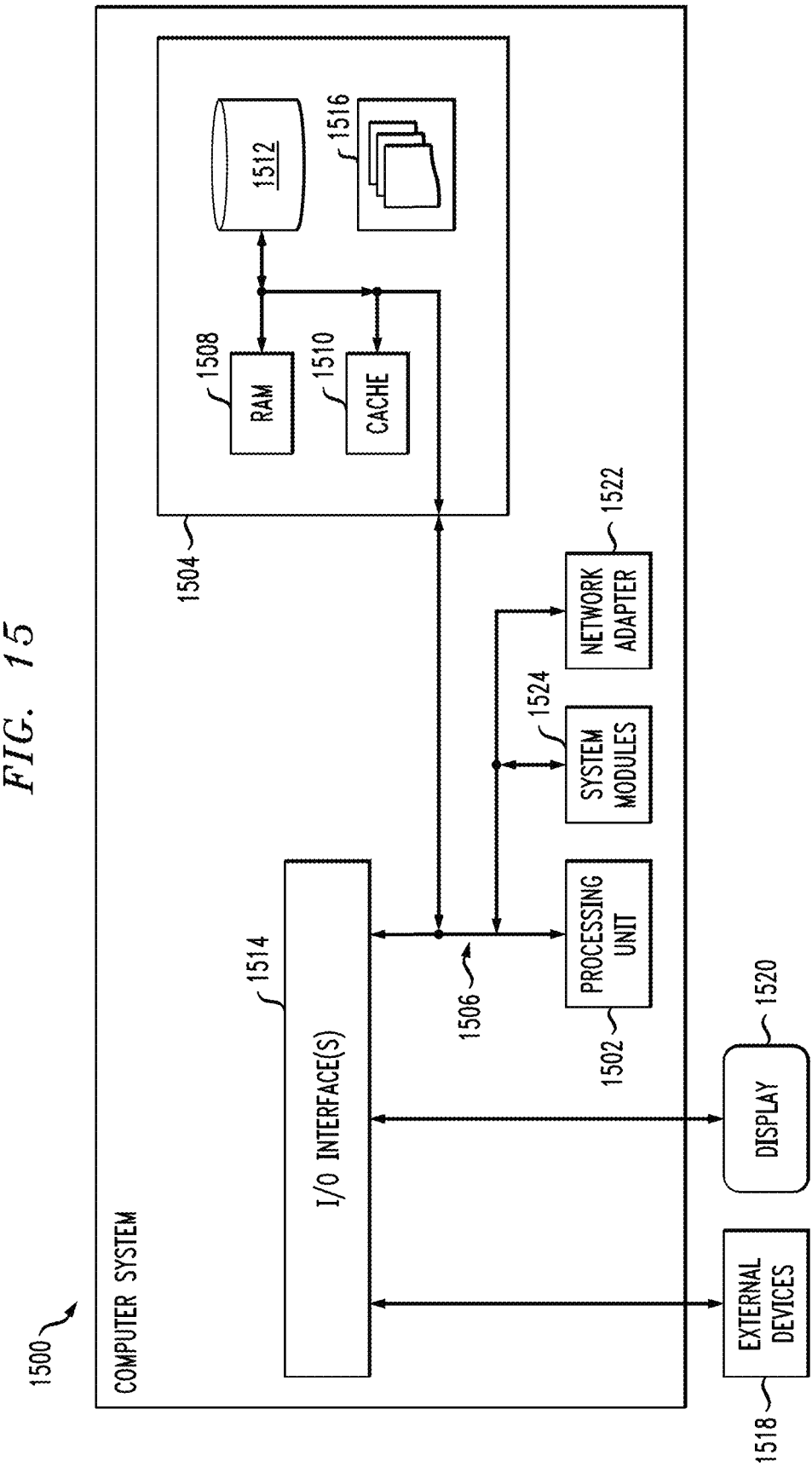
FIG. 15 is a block diagram depicting at least a portion of an illustrative computing system suitable for executing program code related to the proposed methods, according to an embodiment of the present invention.

As shown in FIG. 15, the computer system 1500 is illustrated in the form of a general-purpose computing device. Components of computer system 1500 may include, but are not limited to, one or more processors or processing units 1502, a smbnjj@BhvH system memory 1504, and a bus 1506 that couple various system components including system memory 1504 to the processor 1502. Bus 1506 represents one or more of any of several types of bus architectures, including a memory bus or memory controller, a peripheral bus, an accelerated graphics port, and a processor or local bus using any of a variety of bus architectures. By way of example only and without limitation, such bus architectures include, for example, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 1500 typically includes a variety of computer system readable media. Such media may be any available media that is accessible by computer system 1500, and it includes both, volatile and non-volatile media, removable and non-removable media.

The system memory 1504 may include computer system readable media in the form of volatile memory, such as random-access memory (RAM) 1508 and/or cache memory 1510. Computer system 1500 may further include other removable/non-removable, volatile/non-volatile computer system storage media. By way of example only, a storage system 1512 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, memory 1504 may include at least one program product having a set (e.g., at least one) of program modules that are configured to carry out the functions of embodiments of the invention.

The program/utility, having a set (at least one) of program modules 1516, may be stored in the memory 1504 by way of example, and not limiting, as well as an operating system, one or more application programs, other program modules, and program data. Each of the operating systems, one or more application programs, other program modules, and program data or some combination thereof, may include an implementation of a networking environment. The program modules 1516 generally carry out the functions and/or methodologies of embodiments of the invention, as described herein (e.g., one or more of steps 202 through 210 shown in FIG. 2).

The computer system 1500 may also communicate with one or more external devices 1518 such as a keyboard, a pointing device, a display 1520, etc.; one or more devices that enable a user to interact with the computer system 1500; and/or any devices (e.g., network card, modem, etc.) that enable the computer system 1500 to communicate with one or more other computing devices. Such communication can occur via one or more input/output (I/O) interfaces 1514. Still yet, the computer system 1500 may communicate with one or more networks such as a local area network (LAN), a general wide area network (WAN), and/or a public network (e.g., the Internet) via at least one network adapter 1522. As depicted, the network adapter 1522 may communicate with the other components of the computer system 1500 via the bus 1506. Although not explicitly shown, other hardware and/or software components could be used in conjunction with the computer system 1500. Examples, include, but are not limited to: microcode, device drivers, redundant processing units, external disk drive arrays, redundant array of independent disks (RAID) systems, tape drives, and data archival storage systems, etc.

Additionally, further components of the system for enhancing routability in a cell-based design in the form of one or more system modules 1524 are attached to the bus 1506. This may include, for example, a prediction module, for estimation routing congestion in the placement, a short distribution module, for determining the location of shorts in the design layout, a pin density module, for determining the number and/or location of pins in the layout, a placement legalization module, configured to determine whether a given placement complies with prescribed design rules, optimization modules, configured to perform certain optimizations on the placement (e.g., wire length minimization, time budget calculations, etc.), and a detailing routing module, for performing detailed routing on the placement. It is to be understood that one or more embodiments of the invention beneficially enhance the efficiency and/or performance of the computer system 1500.

The descriptions of the various embodiments of the present invention have been presented for purposes of illustration, but are not intended to be exhaustive or limited to the embodiments disclosed. Modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be embodied as a system, a method, and/or a computer program product. The computer program product may include a computer readable storage medium (or media) having computer readable program instructions embodied thereon for causing at least one processor to carry out one or more aspects of the present invention.

The tangible medium on which the computer readable program instructions may be embodied include electronic, magnetic, optical, electromagnetic, infrared or a semiconductor system for a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be any non-transitory (i.e., tangible) device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, chip design layouts, apparatus (systems), and computer program products according to embodiments of the invention. It will be understood that each block of the flowchart illustrations and/or block diagrams, and combinations of blocks in the flowchart illustrations and/or block diagrams, or portions thereof, can be implemented by computer readable program instructions.

These computer readable program instructions may be provided to one or more processors of a general purpose computer, special purpose computer, or other programmable data processing apparatus to produce a specific machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams shown in the figures illustrate the architecture, functionality, and operation of possible implementations of systems, methods, and computer program products according to various embodiments of the present invention. In this regard, each block in the flowchart or block diagrams may represent a module, segment, circuit, or portion of instructions, which comprises one or more executable instructions for implementing the specified logical function(s). In some alternative implementations, the functions noted in the block may occur out of the order noted in the figures. For example, the functionality embodied by two blocks shown in succession may, in fact, be performed substantially concurrently, or the blocks may sometimes be executed in the reverse order, depending upon the functionality involved.

It will also be noted that each block in the block diagrams and/or flowchart illustrations, and combinations of blocks in the block diagrams and/or flowchart illustrations, can be implemented by special purpose hardware-based systems that perform the specified functions or act or carry out combinations of special purpose hardware and computer instructions. Accordingly, the specification and drawings are to be regarded in an illustrative rather than a restrictive sense.

Reference made throughout this specification to "one embodiment" or "an embodiment" is intended to mean that a particular feature, structure, or characteristic described in connection with the embodiment is included in at least one embodiment of the claimed subject matter. It is to be understood that appearances of the phrase "in one embodiment" or "an embodiment" are not necessarily all referring to the same embodiment. Furthermore, embodiments may be referred to herein, individually and/or collectively, by the term "embodiment" merely for convenience and without intending to limit the scope of this application to any single embodiment or inventive concept if more than one is in fact shown. Thus, although specific embodiments have been illustrated and described herein, it is to be appreciated that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below," where used, are intended to indicate the position of elements or structures relative to one another, rather than to absolute location.

The corresponding structures, materials, acts, and equivalents of any means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit thereof. The embodiments were chosen and described in order to best explain principles and practical applications, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, the claimed subject matter may lie in less than all features of a single embodiment. Thus, the following claims are hereby incorporated into the Detailed Description, with each claim standing on its own as separately claimed subject matter.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. A method for enhancing routability in a cell-based design, the method comprising:
   obtaining an initial layout corresponding to a placement of cells in the cell-based design;
   identifying one or more areas of the initial layout where routability is predicted to be constrained;
   selectively adding white spaces to the identified one or more areas of the initial layout where routability is predicted to be constrained to thereby generate a modified layout;
   legalizing placement of the modified layout;
   running a detailed routing on the modified layout; and
   obtaining a short distribution map indicating a location of shorts in the initial layout, wherein identifying one or more areas of the initial layout where routability is predicted to be constrained is performed based on the short distribution map.

2. The method of claim 1, further comprising obtaining a routing congestion map corresponding to the cell-based design, the routing congestion map indicating areas of the initial layout where routing congestion is estimated to be high, wherein identifying the one or more areas of the initial layout where routability is predicted to be constrained is performed based on the routing congestion map.

3. The method of claim 2, wherein selectively adding white spaces to the identified one or more areas of the initial layout comprises:
   partitioning the initial layout into a plurality of tiles;
   assigning each of the plurality of tiles in the initial layout a congestion number based on the routing congestion map; and
   adding white spaces to each of the plurality of tiles having a congestion number that exceeds a prescribed routing threshold, the routing threshold being indicative of a desired congestion number for each of the plurality of tiles.

4. The method of claim 3, wherein assigning each of the plurality of tiles a congestion number comprises:
   determining, for each tile of the plurality of tiles in the initial layout, a total capacity of wires that can be routed through the tile; and
   determining a percentage of wires passing through the tile, wherein the congestion number for the tile is calculated as a function of the percentage of wires passing through the tile divided by the total capacity of wires that can be routed through the tile.

5. The method of claim 3, wherein selectively adding white spaces to the identified one or more areas of the initial layout further comprises:
   using different routing thresholds to modulate an amount of white spaces inserted into the plurality of tiles to thereby generate a modified layout corresponding to each of the different routing thresholds; and
   based on a short distribution map corresponding to the initial layout, selecting one of the different routing thresholds that generates a modified layout having a minimum number of signal route shorts in the modified layout.

6. The method of claim 1, wherein selectively adding white spaces to the identified one or more areas of the initial layout comprises:
   partitioning the initial layout into a plurality of tiles; and
   based on the short distribution map, adding white spaces to each tile of the plurality of tiles in the initial layout having a number of shorts that exceeds a prescribed short count threshold, the short count threshold being indicative of a desired maximum number of shorts for each of the plurality of tiles.

7. The method of claim 6, wherein selectively adding white spaces to the identified one or more areas of the initial layout further comprises:
   using different short count thresholds to modulate an amount of white spaces inserted into the plurality of tiles to thereby generate a modified layout corresponding to each of the different short count thresholds; and
   based on the short distribution map, selecting one of the different short count thresholds that generates a modified layout having a minimum number of signal route shorts in the modified layout.

8. The method of claim 1, wherein selectively adding white spaces to the identified one or more areas of the initial layout where routability is predicted to be constrained comprises at least one of adding one or more vertical stripes and one or more horizontal stripes to the identified one or more areas of the initial layout, each of the stripes being indicative of an empty space in the design that is not occupied by any cell.

9. The method of claim 1, further comprising applying at least one of placement optimization and timing optimization to the modified layout prior to running the detailed routing on the modified layout, wherein the placement and timing optimizations are configured to minimize perturbations of the modified layout from the initial layout.

10. The method of claim 1, wherein selectively adding white spaces to the identified one or more areas of the initial layout where routability is predicted to be constrained comprises at least one of adding one or more vertical stripes and one or more horizontal stripes to the identified one or more areas of the initial layout, each of the stripes being indicative of an empty space in the design that is not occupied by any cell.

11. A method for enhancing routability in a cell-based design, the method comprising:
   obtaining an initial layout corresponding to a placement of cells in the cell-based design;

identifying one or more areas of the initial layout where routability is predicted to be constrained;

selectively adding white spaces to the identified one or more areas of the initial layout where routability is predicted to be constrained to thereby generate a modified layout;

legalizing placement of the modified layout;

running a detailed routing on the modified layout; and obtaining a pin density map indicating a location of pins in the initial layout, wherein identifying one or more areas of the initial layout where routability is predicted to be constrained is performed based on the pin density map.

12. The method of claim 11, wherein selectively adding white spaces to the identified one or more areas of the layout comprises:

partitioning the initial layout into a plurality of tiles; and based on the pin density map, adding white spaces to each tile of the plurality of tiles having a number of pins that exceeds a prescribed pin count threshold, the pin count threshold being indicative of a desired maximum pin density for each of the plurality of tiles.

13. An apparatus for enhancing routability in a cell-based design, the apparatus comprising:

memory; and at least one processor coupled with the memory, the at least one processor being configured: to obtain an initial layout corresponding to a placement of cells in the cell-based design; to identify one or more areas of the initial layout where routability is predicted to be constrained; to selectively add white spaces to the identified one or more areas of the initial layout where routability is predicted to be constrained to thereby generate a modified layout; to legalize placement of the modified layout; and to run a detailed routing on the modified layout;

wherein the at least one processor is further configured to receive a short distribution map indicating a location of shorts in the initial layout, and wherein identifying one or more areas of the initial layout where routability is predicted to be constrained is performed based on the short distribution map.

14. The apparatus of claim 13, wherein the at least one processor is further configured to receive a routing congestion map corresponding to the cell-based design, the routing congestion map indicating areas of the initial layout where routing congestion is estimated to be high, wherein identifying the one or more areas of the initial layout where routability is predicted to be constrained is performed based on the routing congestion map.

15. The apparatus of claim 14, wherein the at least one processor is further configured:

to partition the initial layout into a plurality of tiles;

to assign each of the plurality of tiles in the initial layout a congestion number based on the routing congestion map; and to add white spaces to each of the plurality of tiles having a congestion number that exceeds a prescribed routing threshold, the routing threshold being indicative of a desired congestion number for each of the plurality of tiles.

16. The apparatus of claim 15, wherein the congestion number for each of the plurality of tiles is calculated, by the at least one processor, as a function of a percentage of wires passing through the tile divided by a total capacity of wires that can be routed through the tile.

17. The apparatus of claim 13, wherein the at least one processor is further configured:

to partition the initial layout into a plurality of tiles; and based on the short distribution map, to add white spaces to each tile of the plurality of tiles in the initial layout having a number of shorts that exceeds a prescribed short count threshold, the short count threshold being indicative of a desired maximum number of shorts for each of the plurality of tiles.

18. The apparatus of claim 17, wherein the at least one processor is further configured:

to modulate an amount of white spaces inserted into the plurality of tiles using different short count thresholds to thereby generate a modified layout corresponding to each of the different short count thresholds; and based on the short distribution map, to select one of the different short count thresholds that generates a modified layout having a minimum number of signal route shorts in the modified layout.

19. The apparatus of claim 13, wherein the at least one processor is further configured to receive a pin density map indicating a location of pins in the initial layout, and wherein identifying one or more areas of the initial layout where routability is predicted to be constrained is performed based on the pin density map.

20. The apparatus of claim 13, wherein the processor is configured to at least one of add one or more vertical stripes and one or more horizontal stripes to the identified one or more areas of the initial layout, each of the stripes being indicative of an empty space in the design that is not occupied by any cell, to selectively add white spaces to the identified one or more areas of the initial layout where routability is predicted to be constrained.

* * * * *